(12) United States Patent
Opalka et al.

(10) Patent No.: US 9,920,724 B2
(45) Date of Patent: Mar. 20, 2018

(54) CHEMICAL SCAVENGING COMPONENT FOR A FUEL SYSTEM

(71) Applicant: United Technologies Corporation, Hartford, CT (US)

(72) Inventors: Susanne M. Opalka, Glastonbury, CT (US); Haralambos Cordatos, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/887,218

(22) Filed: Oct. 19, 2015

(65) Prior Publication Data

US 2017/0107960 A1   Apr. 20, 2017

(51) Int. Cl.
| | | |
|---|---|---|
| *F02M 37/22* | (2006.01) |
| *F02M 61/16* | (2006.01) |
| *B01J 23/10* | (2006.01) |
| *B01J 35/04* | (2006.01) |
| *B01J 35/06* | (2006.01) |
| *C01F 17/00* | (2006.01) |
| *B01J 37/02* | (2006.01) |
| *C10L 1/00* | (2006.01) |
| *F23K 5/08* | (2006.01) |

(52) U.S. Cl.
CPC ............. *F02M 37/22* (2013.01); *B01J 23/10* (2013.01); *B01J 35/04* (2013.01); *B01J 35/06* (2013.01); *B01J 37/0215* (2013.01); *B01J 37/0225* (2013.01); *C01F 17/0043* (2013.01); *C10L 1/00* (2013.01); *F02M 61/16* (2013.01); *F23K 5/08* (2013.01)

(58) Field of Classification Search
CPC ......... F02M 37/22; F02M 61/16; B01J 35/04; B01J 35/06; B01J 37/0215; B01J 37/0225
USPC .................................. 123/445, 196 A, 198 A
See application file for complete search history.

(56) References Cited

U.S. PATENT DOCUMENTS

| | | |
|---|---|---|
| 5,315,822 A | 5/1994 | Edwards |
| 5,336,560 A | 8/1994 | Spence et al. |
| 5,805,973 A | 9/1998 | Coffinberry et al. |
| 5,833,141 A | 11/1998 | Bechtel, II et al. |
| 5,891,584 A | 4/1999 | Coffinberry |
| 5,971,759 A | 10/1999 | Richeda |
| 6,123,273 A | 9/2000 | Loprinzo et al. |
| 6,145,763 A | 11/2000 | Fleming et al. |
| 6,221,498 B1 | 4/2001 | Takahama et al. |
| 6,273,348 B1 | 8/2001 | Shouji et al. |
| 6,444,326 B1 | 9/2002 | Smith |

(Continued)

FOREIGN PATENT DOCUMENTS

WO    2014092944    6/2014

OTHER PUBLICATIONS

Xue, Y., et al. (2011). Direct evidence for hydroxyl radical scavenging activity of cerium oxide nanoparticles. The Journal of Physical Chemistry, 2011, 115, 4433-4438.

(Continued)

*Primary Examiner* — Mahmoud Gimie
(74) *Attorney, Agent, or Firm* — Carlson, Gaskey & Olds, P.C.

(57) ABSTRACT

A chemical scavenging component includes a porous body that has a radical-scavenging material. The radical-scavenging material has a composition that includes cerium oxide that is chemically active with regard to oxygen-containing radicals.

23 Claims, 2 Drawing Sheets

(56) References Cited

U.S. PATENT DOCUMENTS

| | | | |
|---|---|---|---|
| 6,511,760 B1 | 1/2003 | Barone et al. | |
| 6,630,244 B1 | 10/2003 | Mao et al. | |
| 7,070,833 B2 | 7/2006 | Smith et al. | |
| 2006/0233691 A1* | 10/2006 | Vanderspurt | B01J 23/002 423/263 |
| 2007/0220873 A1* | 9/2007 | Bosteels | B01D 53/9413 60/299 |
| 2009/0071848 A1 | 3/2009 | Seal et al. | |
| 2010/0230359 A1 | 9/2010 | Whitehead et al. | |
| 2011/0016775 A1 | 1/2011 | Hazarika et al. | |
| 2013/0048748 A1 | 2/2013 | Imoehl et al. | |
| 2013/0118060 A1* | 5/2013 | Reed | B01F 3/0807 44/322 |
| 2013/0219914 A1* | 8/2013 | Budge | C10G 27/04 60/780 |

OTHER PUBLICATIONS

Singh, V. (2012). Rare earth oxide coating with controlled chemistry using thermal spray. Dissertation, University of Central Florida, Orlando, Florida. Spring 2012.

Saha, A., et al. (2009). Thermo-physical processes in cerium nitrate precursor droplets injected into high temperature plasma. Surface & Coatings Technology 203 (2009) 2081-2091.

Chen, L.W. and Wang, X.H. (2000). Sintering dense nanocrystalline ceramics without final-stage grain growth. Department of Materials Science and Engineering, University of Pennsylvania.

Gantt, B. Near-road modeling and measurement of cerium-containing particles generated by nanoparticle diesel fuel additive use. National Exposure Research Laboratory, U.S. Environmental Protection Agency, Research Triangle Park, NC.

Mellaerts, R. et al. (2013). Screening protocol for identifying inorganic oxides with anti-oxidant and pro-oxidant activity for biomedical, environmental and food preservation applications. RSC Advances, 2013, 3 900-909.

Kuprowicz, N. et al. (2007). Use of measured species class concentrations with chemical kinetic modeling for the prediction of autoxidation and deposition of jet fuels. Energy & Fuels, 2007, 21, 530-544.

Kleinlogel, C. and Gauckler, L.J. (2001). Sintering of nanocrystalline CeO2 Ceramics. Advanced Materials, 2001, 13, No. 14, Jul. 18.

Cordatos, H. et al. (1996). Simulated annealing study of the structure and reducibility in ceria clusters. Journal of of Physical Chemistry, 1996, 100, 18128-18132.

Cordatos, H. et al. (1996). Effect of ceria structure on oxygen migration for Rh/ceria catalysts. Journal of of Physical Chemistry, 1996, 100, 785-789.

Zhou, Y. (2015). Nanostructured cerium oxide based catalysts: Synthesis, physical properties, and catalytic performance. Student Research Projects, Dissertations, and Theses—Chemistry Department. University of Nebraska—Lincoln. Paper 61.

Beaver, B. (1994). Development of oxygen scavenger additives for jet fuels. AFOSR Research Grant #F49620-93-1-0224. Duquesne University—Department of Chemistry.

Altin, O. et al. (2004). Ti and Al oxide coatings on inconel 718 against metal sulfide formation and carbon deposition from heated JP-8 fuel. Prepr. Pap.—Am. Chem. Soc., Div. Fuel Chem. 2004, 49(2), 778.

European Search Report for European Patent Application No. 16194416.0 completed Mar. 7, 2017.

\* cited by examiner

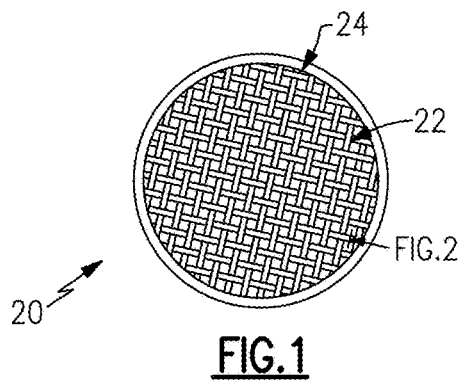
FIG.1
FIG.2
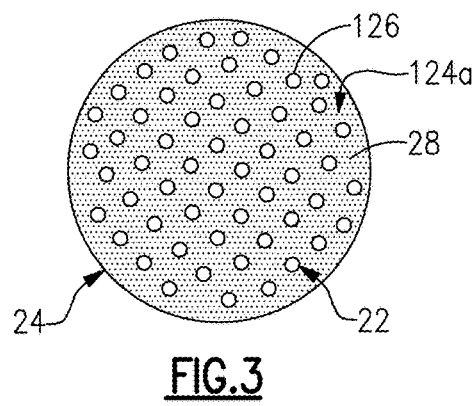
FIG.3
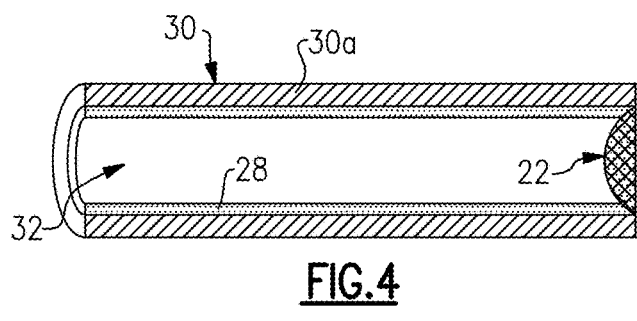
FIG.4
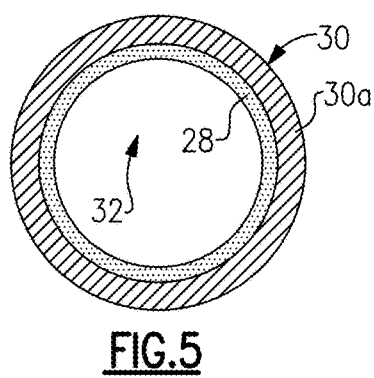
FIG.5
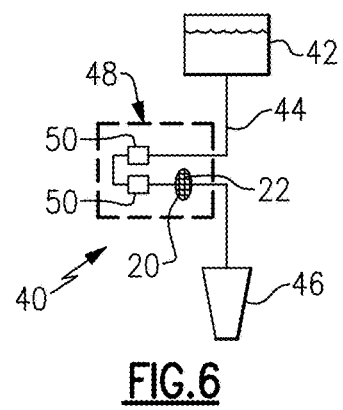
FIG.6

CHEMICAL SCAVENGING COMPONENT FOR A FUEL SYSTEM

BACKGROUND

Hydrocarbon fuels may pick up oxygen from the environment. The oxygen dissolves in the fuel and can potentially promote fuel reactions that form carbonaceous deposits, sometimes referred to as coking deposits or varnish. Fuel systems can include a fuel deoxygenator device to remove dissolved oxygen and thus reduce the potential for forming the deposits.

SUMMARY

A chemical scavenging component for a fuel system, according to an example of the present disclosure, includes a porous body that has a radical-scavenging material. The radical-scavenging material has a composition that includes cerium oxide that is chemically active with regard to oxygen-containing radicals.

In a further embodiment of any of the forgoing embodiments, the porous body is a filter mesh.

In a further embodiment of any of the forgoing embodiments, the filter mesh includes particles fixed therein, and the particles include the cerium oxide.

In a further embodiment of any of the forgoing embodiments, the porous body is a packed bed with media particles that include the cerium oxide.

In a further embodiment of any of the forgoing embodiments, the porous body is a monolithic screen formed of the cerium oxide.

In a further embodiment of any of the forgoing embodiments, the porous body includes a substrate and a coating fixed on the substrate, the coating including the cerium oxide.

In a further embodiment of any of the forgoing embodiments, the porous body is selected from the group consisting of a filter mesh that includes particles of the cerium oxide fixed therein, a monolithic screen formed of the cerium oxide, and a packed bed with media particles that include the cerium oxide.

A chemical scavenging component for a fuel system, according to an example of the present disclosure, includes a substrate and a radical-scavenging coating fixed on the substrate. The radical-scavenging coating has a composition that includes cerium oxide that is chemically active with regard to oxygen-containing radicals in hydrocarbon fuel.

In a further embodiment of any of the forgoing embodiments, the substrate is a screen.

In a further embodiment of any of the forgoing embodiments, the screen is a wire mesh.

In a further embodiment of any of the forgoing embodiments, the screen is a perforated sheet.

In a further embodiment of any of the forgoing embodiments, the screen is formed of stainless steel.

In a further embodiment of any of the forgoing embodiments, the substrate is a fuel tube.

In a further embodiment of any of the forgoing embodiments, the composition consists essentially of the cerium oxide.

In a further embodiment of any of the forgoing embodiments, the chemical activity of the cerium oxide is reversible in the hydrocarbon fuel.

In a further embodiment of any of the forgoing embodiments, the cerium oxide includes nanocrystallites.

A fuel system according to an example of the present disclosure includes fuel tank, at least one fuel injector, at least one fuel tube that connects the fuel tank with the fuel injector, and a screen fixed in fuel tube. The screen includes a radical-scavenging material. The radical-scavenging material has a composition that includes cerium oxide that is chemically active with regard to oxygen-containing radicals.

In a further embodiment of any of the forgoing embodiments, the fuel tube includes a fueldraulic circuit, and the screen is fixed in the fueldraulic circuit.

In a further embodiment of any of the forgoing embodiments, the screen is a wire mesh or a perforated sheet, with a coating of the cerium oxide material.

In a further embodiment of any of the forgoing embodiments, the screen is formed of stainless steel.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example chemical scavenging component that has a radical-scavenging material.

FIG. 2 illustrates a cross-section through a portion of the chemical scavenging component of FIG. 1.

FIG. 3 illustrates another example chemical scavenging component that includes a perforated sheet.

FIG. 4 illustrates another example chemical scavenging component that includes a fuel tube, and the interior of the fuel tube includes a radical-scavenging coating.

FIG. 5 illustrates a cross-section through the fuel tube.

FIG. 6 illustrates an example fuel system with a chemical scavenging component.

DETAILED DESCRIPTION

Figure 7A:
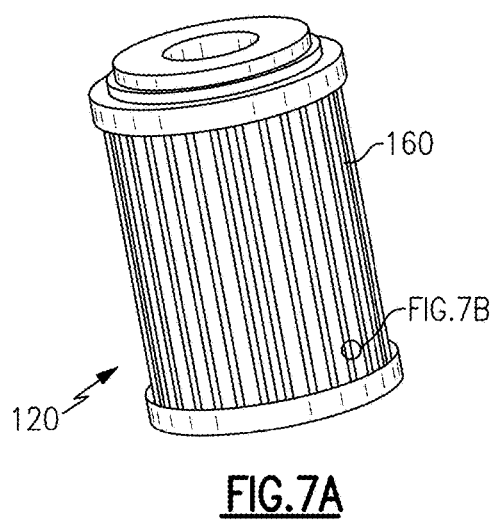
FIG. 7A illustrates a fuel filter chemical scavenging component.

Fuel system deoxygenator devices or even molecular oxygen scavengers can remove dissolved oxygen ($O_2$) from hydrocarbon-based fuels, such as but not limited to, jet fuels and diesel fuels. However, if the dissolved oxygen reacts with fuel hydrocarbons prior to treatment by the deoxygenator device or the molecular oxygen scavenger (e.g., in an aircraft, a non-aircraft storage such as a fuel farm, or handling unit such as a fuel-dispensing terminal), the reaction can form alkyl hydroperoxides (ROOH, where R is an alkyl group originating from hydrocarbon fuel molecules) and related oxygen-containing radicals originating from the fuel, such as alkyl peroxyl (ROO.), alkoxy (RO.), hydroperoxyl (HOO.), and hydroxyl (HO.) radicals. The alkyl hydroperoxides and oxygen-containing radicals can potentially further react with the fuel to auto-accelerate the formation of carbonaceous deposits, such as coke or varnish, on fuel system components. These deposits can degrade the performance of fuel system components, including valves, filters, and bearings.

Although deoxygenator devices and molecular oxygen scavengers remove $O_2$, such devices are not capable of removing the oxygen-containing radicals. Oxygen-containing radicals can be removed as disclosed herein by radical scavengers that are exposed to liquid fuel. The radical scavengers contain one or more active radical scavenger ceria crystallites. As will be described in more detail, the ceria crystallites may be provided in a coating on a substrate, as a monolithic material component, or as particles fixed on a filter element, filter media, or other support.

FIG. 1 schematically illustrates a chemical scavenging component 20 for a fuel system. The component 20 includes a radical-scavenging material that can remove oxygen-containing radicals from fuel, such as liquid hydrocarbon-based fuel, and thus facilitate the reduction of carbonaceous deposits in fuel systems. In this example, the component 20 includes a porous body 22 that is formed in the geometry of a functional fuel system component. For instance, the porous body 22 is a non-moving component that, in addition to treating fuel for removal of oxygen-containing radicals, also serves one or more other fuel treatment functions. In the illustrated example, the porous body 22 is a screen 24 that serves to filter relatively large contaminant particles out of the fuel. The screen 24 is substantially flat, but could alternatively be curved or bent.

In this example, the screen 24 is a composite structure that includes a (structural) substrate and a coating that includes the radical-scavenging material. For instance, the screen 24 is formed of a stainless steel substrate that serves as a structural support for a conformal coating with the radical-scavenging material. As can be appreciated, the substrate is not limited to screens and could alternatively be a different or additional functional component, such as but not limited to, a fuel tube, a filter element, filter media particles, or the like. Where the screen 24 is a "last chance filter," the radical-scavenging material can additionally be used in upstream fuel components.

FIG. 2 illustrates a cross-section through a portion of the screen 24. In this example, the screen 24 is a porous wire mesh 24a. In one alternative example shown in FIG. 3, the screen 24 is a perforated sheet 124a that has a pattern of through-holes 126. In each example, the screen 24 has a radical-scavenging coating 28 fixed thereon. The radical-scavenging coating 28 is conformal to the geometry of the substrate.

The coating 28 has a composition that includes cerium oxide as the radical-scavenging material. In one further example, the coating 28 is primarily composed of cerium oxide (>50% by weight). In a further example, the coating 28 is substantially fully formed of cerium oxide and unintended impurities not purposely added. Additionally, the cerium oxide may optionally be doped with one or more dopant elements, such as zirconium, to modify the properties of the coating 28. Such dopants may include transition metal or rare earth elements. In further examples, the cerium oxide is mixed or dispersed with a binder matrix material, such as but not limited to, an aluminosilicate sol-gel or an amorphous silicon material. The composition of the binder matrix can be tailored for strong adhesion and a matched coefficient of thermal expansion with a substrate.

The thickness of the coating 28 is sufficient to substantially fully cover the surfaces of the substrate. For instance, for use of the screen 24 in an aircraft fuel system, the coating thickness is approximately 0.2 to 1 micrometers. Below approximately 0.2 micrometers there may be a potential for incomplete coating coverage or defects, which could leave the underlying substrate susceptible to environmental exposure. Above approximately 1 micrometer there may be potential to plug the wire mesh or the holes in the perforated sheet. For example, the mesh/holes are approximately 40 to 100 micrometers in size.

The coating 28 has good adhesion with the stainless steel of the screen 24. However, if enhanced adhesion is needed, either for stainless steel or other substrate material, one or more primer layers may be used between the coating 28 and the surface of the substrate.

The cerium oxide is chemically active with regard to oxygen-containing radicals, and thus acts as a catalyst that facilitates removal of such radicals from fuel that is exposed to the cerium oxide. In this regard, the porous body 22, such as the screen 24, is a particularly useful structure because it has a relatively high surface area for contact with the fuel in comparison to a non-porous body. The fuel is thus readily exposed to the cerium oxide for removal of oxygen-containing radicals.

For use in liquid hydrocarbon fuel systems the chemical activity of the cerium oxide catalyst is tailored to enhance reactivity with oxygen-containing radicals and hydrocarbon fragments (i.e., coke or varnish deposit precursors). For example, the chemical activity of the cerium oxide with regard to radicals and, more specifically, the reversibility of the chemical activity, depends on the flexibility of the lattice structure of the cerium oxide for accommodating reaction sites that can form oxygen vacancies by locally changing the cerium oxidation state. The reversible oxidation-reduction of the cerium oxide catalyst is promoted by facile bulk oxygen diffusivity and the bifunctional nature of the reaction sites. Cerium oxide can diffuse oxygen atoms in its lattice by moving an oxygen atom through a chain of reaction sites that cycle between a cerium(III) state (with a higher Ce:O stoichiometry, such as $Ce_2O_3$) and a cerium(IV) state (with the typical Ce:O stoichiometry of $CeO_2$). One reaction site functionality is to scavenge an oxygen atom from an oxygen-bearing radical by oxidizing a reaction site with cerium (III) to a cerium(IV) state. Subsequently, the oxygen atom can diffuse within the bulk lattice to oxidize another nearby cerium(III) site, enabling the original site to return to a cerium(III) state, and so forth. Ultimately, the oxygen atom becomes part of a cerium(IV) site that reacts with a hydrocarbon fragment, resulting in the fragment oxidation and gasification to neutral products, such as carbon dioxide gas and water vapor ($CO_2$ and $H_2O$, respectively). This second functionality results in the reduction of he cerium(IV) site and restores the net oxidation-reduction balance of the catalyst reaction sites, enabling the catalyst turnover for another series of reactions. In this manner, the cerium oxide catalyst deactivates and converts the radical species to prevent the formation of coke or varnish deposits.

The cerium oxide has an atomic structure that is made up of crystallites. A crystallite is a cluster of cerium oxide units (i.e., a unit is $CeO_2$), and a coating or particle of the cerium oxide can contain clusters of crystallites. If the crystallites are relatively large and are of high purity, the atoms of the cerium(IV) oxide arrange in a fluorite atomic structure, which is stable and does not permit the cerium(IV) oxide to easily convert back to cerium(III) oxide in the typical conditions in a fuel system. However, with nanocrystallites with a higher surface area to volume ratio, the atomic structure may differ, and is less stable, such that the reversible oxidation-reduction reactions and facile oxygen mobility is more favorable at the typical conditions in the fuel system. The incorporation of one or more dopants in the cerium oxide lattice creates local defect sites that can more readily accommodate oxygen vacancies. In one example, the cerium oxide nanocrystallites have a size ranging from 1 to 2 nanometers in maximum length and have approximately four to several hundreds of cerium oxide units in a fluorite structure with a monoclinic distortion. In a further example, mixed ceria-zirconia-titania nanocrystallites have a size ranging from 2 to 5 nanometers in maximum length with approximately 100 to 800 cerium oxide units in a tetragonally distorted fluorite structure.

The coating 28 with cerium oxide in the nanocrystallite structure can be fabricated using a spray pyrolysis technique. For example, the technique includes pyrolyzing a spray of aqueous cerium nitrate in nitrogen carrier gas onto a substrate. The substrate is maintained at a temperature of approximately 100-200° C., which evaporates the water and facilitates deposition of the cerium as cerium nitrate rather than as oxide. The substrate with the cerium nitrate coating is then thermally treated at a temperature above the decomposition temperature of the nitrate (approximately 450° C.) in an oxygen-containing environment to convert the cerium to cerium(IV) oxide in the final coating 28. The oxygen-containing environment can be atmospheric air or a nitrogen-enriched air (<21% oxygen). The duration of the thermal treatment may be varied, but approximately 2 hours may be sufficient for a coating thickness of 1 micrometer or less. Other techniques for depositing the cerium oxide may alternatively be used as long as the techniques are able to produce the relatively small crystallite structure.

In a modified example, rather than a composite that includes a substrate and the cerium oxide in the coating 28 on the substrate, the porous body 22 is monolithic cerium oxide. A porous body 22 that is monolithic cerium oxide has a homogenous composition. Such a homogenous composition can consist only of pure cerium oxide, substantially pure cerium oxide with unintended impurities not purposely added, or cerium oxide uniformly dispersed with one or more other materials. The one or more other materials can include, but are not limited to, processing aids, additives, and/or binder materials that are relatively uniformly dispersed with the cerium oxide.

The porous body 22 of monolithic cerium oxide can be fabricated by additive manufacturing or ceramic processing techniques. In one example of additive manufacturing, a powder containing the cerium oxide in the crystallite structure is selectively consolidated according to a Computer-Aided Design model of the component being formed. The powder can include, in addition to the cerium oxide, processing aids, additives, and/or binder materials.

In one example of a ceramic processing technique, a powder containing the cerium oxide in the crystallite structure is formed or pressed into a disk or sheet. The powder can include, in addition to the cerium oxide, processing aids, additives, and/or binder materials. The disk or sheet is then sintered to consolidate the cerium oxide. Either before or after being consolidated, the disk or sheet can be machined or laser drilled to form through-holes in the porous body 22.

In further examples, a fully dense nanocrystallite cerium oxide structure may be obtained by sintering at moderate temperatures (e.g., approximately 1000° C.), using transition metal oxide sintering aids. Example transition metal oxide sintering aids can include, but are not limited to, cobalt oxide ($CoO_3$), yttrium oxide ($Y_2O_3$), and combinations thereof. The nanocrystallite cerium oxide structure is desirable in order to maintain high reactivity with peroxides and radicals, as well as sufficient oxygen storage capacity. A cerium oxide disk or sheet can be prepared by classic or laser sintering methods, followed by machining or laser drilling to form through-holes in the porous body 22.

FIG. 4 illustrates a further example in which the porous body 22, such as the screen 24, is fixed in a fuel tube 30. The fuel tube 30 is also shown in a sectioned view in FIG. 5. The fuel tube 30 is formed of a wall 30a that defines interior passage 32 for the conveyance of fuel. In this example, the coating 28 is also fixed on the interior of the wall 30a (substrate) to thus line the passage 32. The fuel therefore has a greater potential for exposure to the cerium oxide. As can be appreciated, the coating 28 could additionally or alternatively be provided on other substrate fuel tubes or passages.

FIG. 6 illustrates an example fuel system 40 in which the component 20 is employed. The fuel system 40 includes a fuel tank 42, at least one fuel tube 44 for transporting the fuel to one or more fuel injectors 46, and the component 20 (e.g., including the porous body 22 with cerium oxide) is fixed in the fuel tube 44. For example, the porous body 22 is the screen 24 described herein.

In this example, the fuel tube 44 includes a fueldraulic circuit 48, which is the portion of the fuel tube 44 in the dashed box in the figure. A hydraulic circuit operates by liquid water or oil moving in a confined space under pressure. In contrast, a fueldraulic circuit operates by fuel moving in a confined space under pressure. For instance, the fuel flowing through the fueldraulic circuit 48 powers movement of one or more sub-systems 50. The sub-systems 50 can be, but are not limited to, valve actuators, variable stator vanes, and active clearance control mechanisms. In this example, the component 20 is located in the fueldraulic circuit 48. As can be appreciated, the fuel tube 44 could alternatively include the component 20 in a location outside of the fueldraulic circuit 48, and the fuel system 40 could include additional components 20 at multiple different locations.

Additionally or alternatively, the cerium oxide can be incorporated into other types of functional fuel system components. FIG. 7A illustrates another example chemical scavenging component 120. In this example, the component 120 is a fuel filter that includes a filter element 160 that, in addition to removing oxygen-containing radicals, serves to remove small particles from liquid fuel. For instance, the filter element 160 can be, but is not limited to, a pleated fibrous filter sheet.

Figure 7B:
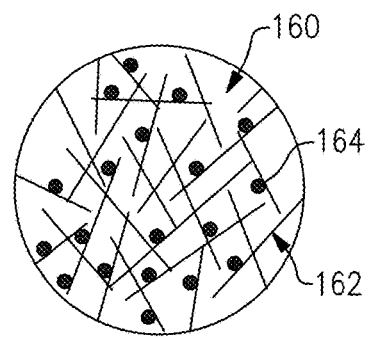
FIG. 7B illustrates a magnified view of a portion of a fuel filter.

As shown in FIG. 7B, the filter element 160 includes a filter (fiber) mesh 162 with particles 164 of cerium oxide fixed therein. The cerium oxide includes the crystallite structure. The particles 164 can be pure cerium oxide, substantially pure cerium oxide with unintended impurities not purposely added, or cerium oxide uniformly dispersed with one or more other materials. The one or more other materials can include, but are not limited to, processing aids, additives, and/or binder materials that are relatively uniformly dispersed with the cerium oxide. The particles 164 can include the cerium oxide as a coating fixed on and/or in a substrate support particle, a monolithic particle of cerium oxide, or a mixture of cerium oxide and one or more other materials in the form of a particle.

The fuel filter can be secured in a fuel passage to treat the fuel. In this regard, the fuel filter may include gaskets or other components to facilitate incorporation into a fuel system. Fuel passes through filter mesh 162 and is exposed to the cerium oxide.

Figure 8A:
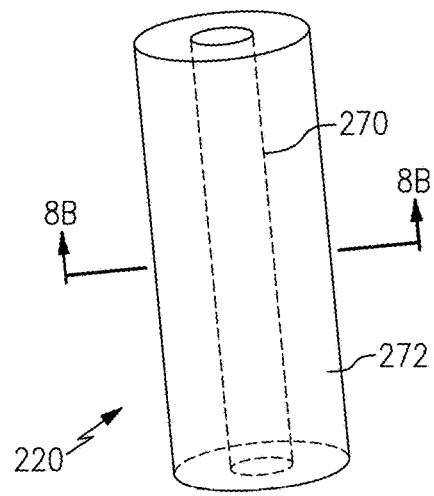
FIG. 8A illustrates a fuel filter cartridge chemical scavenging component.
Figure 8B:
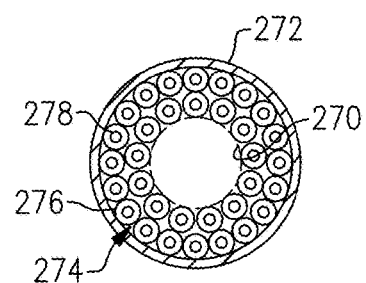
FIG. 8B illustrates sectioned view of a fuel filter cartridge.

FIG. 8A illustrates another example chemical scavenging component 220. In this example, the component 220 is a fuel filter cartridge. For instance, the fuel filter cartridge can be, but is not limited to, a cartridge trap in fuel dispensing system or supply terminal, a cartridge float or suspension system in a fuel tank or container. In this example, the fuel filter cartridge includes a perforated central tube 270, a bag 272, and a packed bed 274 of media particles 276. Each of the media particles 276 includes cerium oxide 278. For example, the cerium oxide 278 can be pure cerium oxide, substantially pure cerium oxide with unintended impurities not purposely added, or cerium oxide uniformly dispersed with one or more other materials. The one or more other materials can include, but are not limited to, processing aids, additives, and/or binder materials that are relatively uniformly dispersed with the cerium oxide. The cerium oxide 278 of the media particles 276 can be a coating fixed on and/or in a substrate support granule, a monolithic granule of cerium oxide, or a mixture of cerium oxide and one or more other materials in the form of a granule.

The fuel filter cartridge can be secured in a fuel passage to treat the fuel. In this regard, the fuel filter cartridge may include gaskets or other components to facilitate incorporation into a fuel system. Fuel passes through the outer bag 272 and flows through the packed bed 274 into the perforated tube 270. As the fuel flows through the packed bed 274 it is exposed to the cerium oxide 278. The outer bag 272 with the packed bed 274 may be removable and replaceable.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

what is claimed is:

1. A chemical scavenging component for a fuel system, the component comprising:
   a porous body including a radical-scavenging material, the radical-scavenging material having a composition including cerium oxide that is chemically active with regard to oxygen-containing radicals, wherein the cerium oxide includes nanocrystallites, wherein the composition includes the cerium oxide dispersed in a binder matrix that includes at least one of aluminosilicate sol-gel or amorphous silicon.

2. The component as recited in claim 1, wherein the porous body is a filter mesh.

3. The component as recited in claim 2, wherein the filter mesh includes particles fixed therein, and the particles include the cerium oxide.

4. The component as recited in claim 1, wherein the porous body is a packed bed with media particles that include the cerium oxide.

5. The component as recited in claim 1, wherein the porous body is a monolithic screen formed of the cerium oxide.

6. The component as recited in claim 1, wherein the porous body includes a substrate and a coating fixed on the substrate, the coating including the cerium oxide.

7. The component as recited in claim 1, wherein the porous body is selected from the group consisting of a filter mesh that includes particles of the cerium oxide fixed therein, a monolithic screen formed of the cerium oxide, and a packed bed with media particles that include the cerium oxide.

8. The component as recited in claim 1, wherein the composition with cerium oxide includes zirconium as a dopant element.

9. The component as recited in claim 1, wherein the nanocrystallites are ceria-zirconia-titania nanocrystallites.

10. The component as recited in claim 1, wherein the nanocrystallites have a size of 1 to 5 nanometers.

11. The component as recited in claim 10, wherein the composition with cerium oxide includes zirconium as a dopant element.

12. The component as recited in claim 11, wherein the composition with cerium oxide includes at least one of cobalt oxide and yttrium oxide.

13. A chemical scavenging component for a fuel system, the component comprising:
    a substrate; and
    a radical-scavenging coating fixed on the substrate, and the radical-scavenging coating has a composition that includes cerium oxide that is chemically active with regard to oxygen-containing radicals in hydrocarbon fuel, wherein the cerium oxide includes nanocrystallites, wherein the composition includes the cerium oxide dispersed in a binder matrix that includes at least one of aluminosilicate sol-gel or amorphous silicon.

14. The component as recited in claim 13, wherein the substrate is a screen.

15. The component as recited in claim 14, wherein the screen is a wire mesh.

16. The component as recited in claim 14, wherein the screen is a perforated sheet.

17. The component as recited in claim 14, wherein the screen is formed of stainless steel.

18. The component as recited in claim 13, wherein the substrate is a fuel tube.

19. The component as recited in claim 13, wherein the chemical activity of the cerium oxide is reversible in the hydrocarbon fuel.

20. A fuel system comprising:
    fuel tank;
    at least one fuel injector;
    at least one fuel tube that connects the fuel tank with the at least one fuel injector; and
    a screen fixed in the at least one fuel tube, the screen including a radical-scavenging material, and the radical-scavenging material has a composition including cerium oxide that is chemically active with regard to oxygen-containing radicals, wherein the cerium oxide includes nanocrystallites, wherein the composition includes the cerium oxide dispersed in a binder matrix that includes at least one of aluminosilicate sol-gel or amorphous silicon.

21. The fuel system as recited in claim 20, wherein the at least one fuel tube includes a fueldraulic circuit, and the screen is fixed in the fueldraulic circuit.

22. The fuel system as recited in claim 20, wherein the screen is a wire mesh or a perforated sheet, with a coating of the cerium oxide material.

23. The fuel system as recited in claim 20, wherein the screen is formed of stainless steel.

* * * * *